United States Patent [19]

Swift et al.

[11] 4,156,978
[45] Jun. 5, 1979

[54] MICROFICHE CARRIER

[75] Inventors: William R. Swift, Placentia; Clyde E. Le Fevre, Orange, both of Calif.

[73] Assignee: AM International, Inc., Los Angeles, Calif.

[21] Appl. No.: 842,156

[22] Filed: Oct. 14, 1977

[51] Int. Cl.² ............................................. G09F 1/10
[52] U.S. Cl. .................................. 40/158 B; 40/361
[58] Field of Search ..................... 40/152, 158 B, 159, 40/158 R, 361

[56] References Cited

U.S. PATENT DOCUMENTS

| 2,896,351 | 7/1959 | Johnson | 40/158 B |
| 3,190,174 | 6/1965 | Field | 40/152 X |
| 3,300,886 | 1/1967 | Donofrio | 40/152 |
| 3,807,074 | 4/1974 | Owens et al. | 40/159 |
| 3,918,188 | 11/1975 | Drwser et al. | 40/158 R |

Primary Examiner—Louis G. Mancene
Assistant Examiner—Wenceslao J. Contreras
Attorney, Agent, or Firm—Michael A. Kondzella; George Jameson; Robert S. Hulse

[57] ABSTRACT

A microfiche carrier is provided comprising a carrier of transparent sheet material having a strip of pressure sensitive adhesive thereon for securing a microfiche to one face of the carrier. The microfiche carrier is adapted to be stacked with other microfiche carriers to form a deck, and the deck is placed into a magazine from which selected microfiche may be partially withdrawn for viewing a particular frame or frames of the microfiche. The microfiche carrier also includes detent means for releasably retaining the microfiche carrier in the magazine, coding means for retrieval of a selected microfiche carrier from the magazine and ramp means to prevent edge interference with adjacent carriers and microfiche in the magazine when a selected microfiche carrier is retrieved from or returned to the magazine.

8 Claims, 5 Drawing Figures

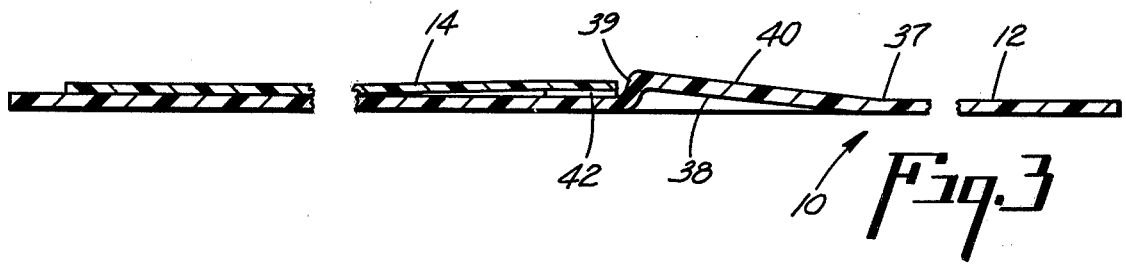
Fig. 3
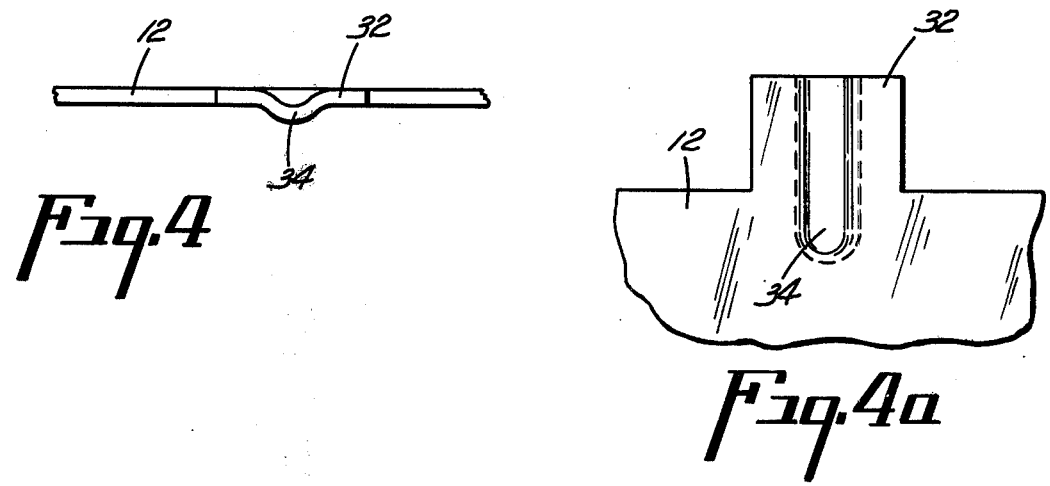
Fig. 4
Fig. 4a

MICROFICHE CARRIER

BACKGROUND OF THE INVENTION

Because of the present day "information explosion", data are being accumulated at such a rapid rate that compact data storage systems are becoming evermore important. One of the most satisfactory data storage systems thus far devised is that of microfilming, wherein sheets of data, reports, books, blueprints, pictures and the like are photographed in a photographically reduced size. Typically, an entire page then requires an area of about one-half inch by five-eighths of an inch. These reduced size frames are then suitably assembled. This system results in a tremendous compaction of storage space requirements.

One of the early methods of assembling these reduced size frames was to position them, tandem-wise, on a reel of film, but this system had the disadvantage that it became difficult to have access to a single frame without somehow going through every frame that preceded it on the reel.

Another method of assembling the reduced size frames was to print related frames on to a given sheet of film, and this became known as microfiche. In using the microfiche, a single frame is more readily retrieved when desired, providing ramdom access to the desired frame.

The microfiche, during its evolution, has taken a number of different sizes, but at the present time there tends to be a standardization. One of the most popular sizes is about 6 inches (150 mm) long and about 4 inches (105 mm) wide, and this size of microfiche may be designed to contain from about 60 to over 400 frames. Other sizes are also in use.

Similarly, microfiche have taken a variety of formats, the available 100 some frames being used for data, titles, coding, etc.

This diversity of microfiche has hindered the storing and retrieval of microfiche stored data. For example, one arrangement attached a notched metal clip to one edge of the microfiche, the notches being coded for use in data retrieval. Another arrangement notched the actual edge of the microfiche. Still another arrangement utilized punched coding holes along the edge of the microfiche. Some other arrangements used optical approaches and still other arrangements used markings to produce a frequency signal.

The main disadvantage of the foregoing arrangements was that they required additional equipment and procedures for manufacturing each type of microfiche. Since each arrangement required different retrieval apparatus, it was extremely difficult to intermix microfiche from different sources.

Another microfiche carrier is disclosed in U.S. Pat. No. 3,807,074 assigned to the same assignee. As shown therein, the carrier takes the form of a plate having a transparent portion adapted to receive a microfiche. The carrier plate may be formed by producing a pocket in a sheet of transparent material, or by folding over a thin sheet of transparent material. The resultant microfiche carrier is a relatively rigid plate containing a microfiche positioned in its transparent portion.

SUMMARY OF THE INVENTION

The present invention provides a carrier for photographically recorded information and, more particularly, a single sided carrier for microfiche.

The carrier comprises a sheet of flexible transparent material provided with a strip of pressure sensitive adhesive for securing thereto a microfiche to produce a microfiche carrier. The carrier is also provided with ramp means in the form of surface deformations to permit insertion and withdrawal of a carrier, to and from a stack or deck of carriers stored in a magazine, without edge interference with adjacent carriers and microfiche in the deck.

The carrier is also provided with detent means for retaining the microfiche carrier in the magazine, and coding tab means for selective retrieval of a carrier from the deck of carriers in the magazine.

The pressure sensitive adhesive on the carrier sheet is protected with a removable cover. At such time as a microfiche carrier is to be assembled by securing a microfiche to the carrier, the protective cover is removed and the microfiche is mounted on the carrier by adhering a marginal edge of the microfiche to the pressure sensitive adhesive.

It is an object of the present invention to provide a single sided microfiche carrier in which the microfiche is adhesively secured to the carrier sheet.

Another object is to provide a microfiche carrier including coding means for selective retrieval of the microfiche carrier from a storage magazine.

Another object is to provide ramp means in the surface of the carrier to prevent edge interference with adjacent carriers and microfiche stored in the magazine during withdrawal and insertion of the carrier out of and into the storage magazine.

A feature of the invention is to provide a carrier for microfiche which is substantially less costly in material and manufacturing costs over existing two-sided carriers.

Other objects, features and advantages of the invention will appear hereinafter as the description proceeds.

IN THE DRAWING

FIG. 3 is a section taken on the line 3—3 of FIG. 1;

FIG. 4 is an end elevation, on an enlarged scale, of a coding tab as viewed on the line 4—4 of FIG. 1; and FIG. 4a is a plan view of the coding tab of FIG. 4.

DESCRIPTION OF THE PREFERRED EMBODIMENT

Figure 1:
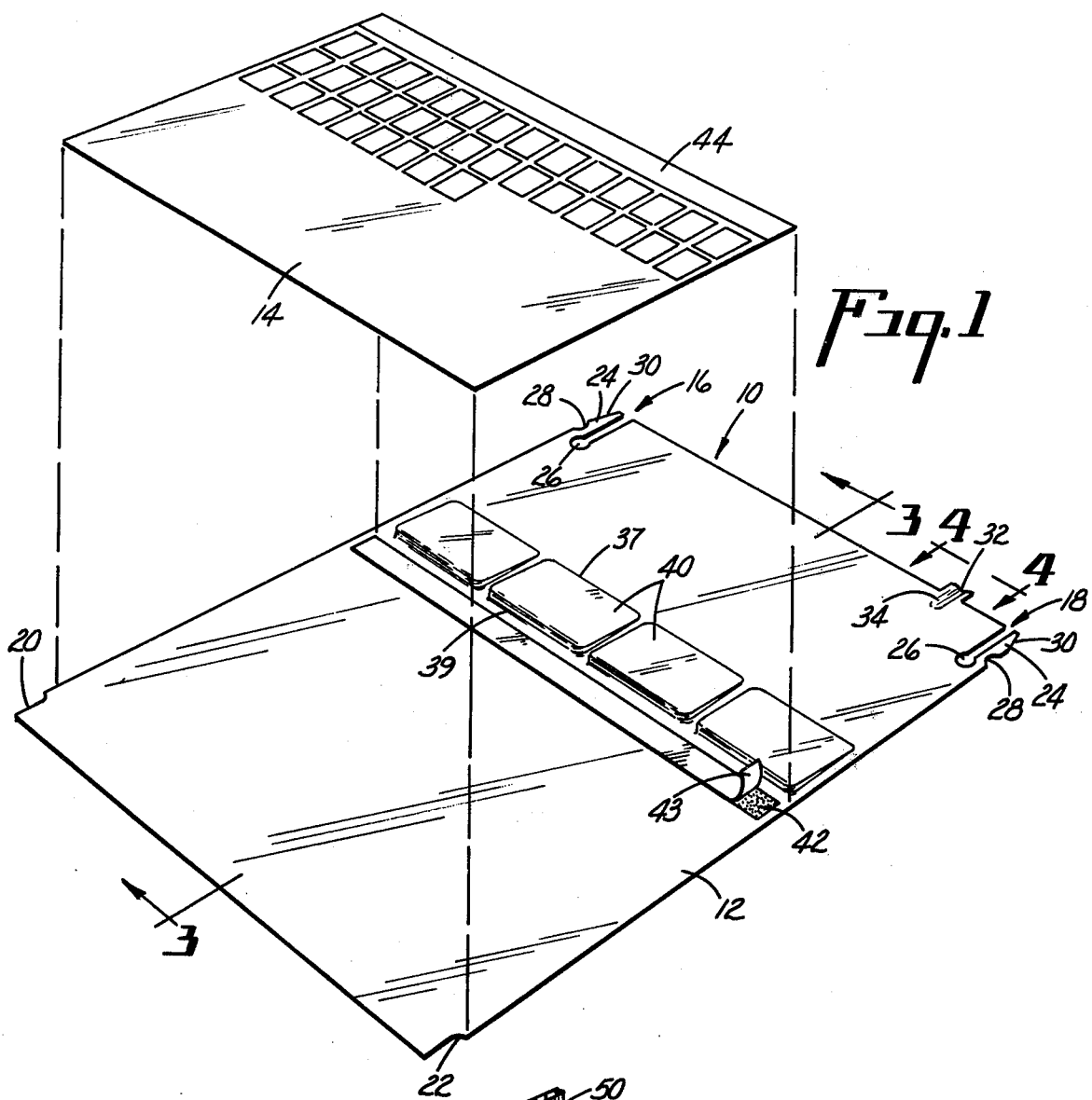
FIG. 1 is an exploded perspective view of an improved microfiche carrier in accordance with the present invention.

With reference to FIGS. 1 and 3, there is shown a microfiche carrier indicated generally by the reference numeral 10 comprising a generally rectangular transparent sheet defining a carrier 12 and a microfiche 14 mounted thereon. The carrier 12 is preferably made of polyester film or the like which provides a flexible but relatively rigid support for the microfiche.

The carrier 12 is provided with a pair of detent elements, indicated generally by the reference numerals 16 and 18, positioned at respective front corners thereof and cut-outs 20 and 22 at the rear corners of the carrier. The detent elements 16 and 18 each comprise an outer flexible leg 24 that can flex transversely as a result of a key-hole slot 26. Each flexible leg 24 is provided on its outer edge with a detent concavity 28 and at its outer end portion with a chamfer 30.

The carrier 12 is also provided with a coding tab 32 on its front edge. The coding tab 32 on each carrier is located at a different position along the front edge of the carrier so that each coding tab is offset horizontally from every other coding tab in a deck of carriers. As best shown in FIGS. 4 and 4a, each coding tab 32 is provided with a deformation so as to produce a rib 34 on the under side of the tab. The rib extends lengthwise from the front edge of the tab 32 to a position slightly below the base of the tab. The rib 34 adds rigidity to the coding tab 32 thereby substantially increasing the useful life of the coding tab as it is acted upon by a pusher member for partially ejecting a microfiche carrier 10 from a storage magazine as will be further explained hereinbelow.

As shown in FIGS. 1 and 3, the carrier 12 is further provided with a plurality of surface deformations produced by pockets 38 depressed into the underside of the carrier 12 so as to produce raised surfaces or ramps 40 on the upper surface of the carrier. Each of the ramps 40 extends from a front edge 37 which is flush with the top surface of the carrier 12 to a rear edge 39 which is raised slightly above the top surface of the carrier, whereby the ramp 40 is angled slightly between the front and the rear edge 37 and 39 respectively. The ramps 40 are positioned approximately centrally of the carrier 12 and extend laterally across the width of the carrier. The ramps 40 preclude edge interference with adjacent carriers and microfiche in the stack during insertion and removal of a selected microfiche carrier into and from the storage magazine.

The carrier 12 is further provided with a narrow strip of pressure sensitive adhesive 42 about three-sixteenths of an inch wide extending transverse to the carrier, parallel with and spaced slightly from the rear edges 39 of the ramps 40. A removable cover strip 43 is provided to protect the adhesive 42 until such time as the microfiche carrier 10 is to be assembled and the microfiche 14 is to be secured to the carrier 12. At such time the protective strip 43 is removed and the microfiche 14 is secured to the carrier by placing a marginal edge 44 of the microfiche 14 into contact with and securing it to the adhesive 42. This arrangement securely holds the microfiche 14 on the carrier 12 and also permits ready replacement of one microfiche with another microfiche. Additionally, because the adhesive 42 is protected by the strip 43 until such time as the microfiche is to be secured to the carrier, there are no loose adhesive particles on the surface of the carrier such as to cause possible selection problems during insertion and removal of the microfiche carrier into and from a deck of microfiche carriers in the storage magazine.

Figure 2:
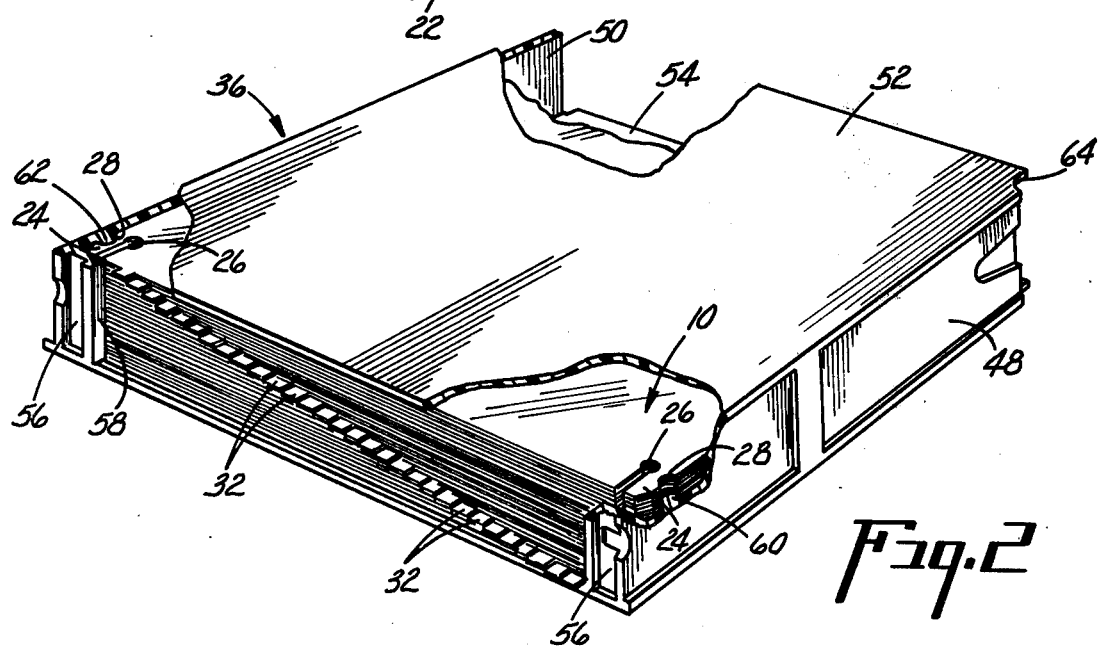
FIG. 2 is a perspective view of a magazine containing a plurality of microfiche carriers showing the magazine and a portion of the carriers partially broken away.

In use, the microfiche carrier 10 is placed with other microfiche carriers in a deck, and the deck is placed into a storage magazine 36 as shown in FIG. 2. Because a standard size carrier 12 is utilized, microfiche having differing sizes and formats can be intermixed within magazine 36.

The magazine 36 as shown in FIG. 2 may be, for example, of the kind disclosed in U.S. Pat. No. 3,991,497 assigned to the same assignee. The magazine is adapted to hold a plurality of microfiche carriers, each carrier 12 having an individual microfiche 14 secured thereon. The individual carriers 12 as shown lay on each other without separation and the ramps 40 permit movement of a selected carrier by partially ejecting the same relative to the deck without edge interferrence with adjacent carriers or microfiche.

The magazine 36 comprises side walls 48 and 50, a top wall 52, a bottom 54 and a front wall 56 containing a window 58. The back of the magazine 36 is open. The side walls 48 and 50 include vertically extending protruding arcuate detent elements 60 and 62 respectively, and the top 52 contains cut-outs 64 at each of the rear corners.

To load the magazine 36, a plurality of microfiche carriers 10 are inserted into the open back of the magazine with the front edge containing the flexible legs 24 and the coding tab 32 facing towards the front of the magazine. When the chamfers 30 of the flexible legs 24 abut the vertically extending protruding arcuate detent elements 60 and 62 on the side walls 48 and 50 of the magazine 36, the flexible legs 24 flex inwardly until the movement of the microfiche carrier 10 causes the detent elements 60 and 62 to engage the detent concavities 28 of the flexible legs 24 and hold each microfiche carrier securely in place within the storage magazine 36.

The coding tabs 32 of the various microfiche carriers extend outwardly through the window 58 of the front wall 56. The coding tabs 32 are short enough so that they do not extend beyond the limits of the magazine. Moreover, the various coding tabs are shown to be staggered or offset horizontally from each other to enable convenient selection of a desired microfiche carrier 10.

The selection of a desired microfiche carrier 10 may be performed manually or, if desired, by means of a vertically oriented pusher bar which is moved transversely of the magazine 36 and by means of which sufficient force can be exerted upon a selected coding tab 32 to disengage the detent concavities 28 of the selected microfiche carrier 10 from the detent elements 60 and 62 and to partially eject the selected microfiche out of the open back of the magazine 36.

Although a device for selecting and partially ejecting a microfiche carrier 10 from a magazine 36 is not shown in the drawing, a suitable manually operable device which can be used is shown, for example, in U.S. Pat. No. Des. 240,765, and a suitable automatically operable device which can be used is shown in U.S. Pat. No. 4,025,177, both assigned to the same assignee as the present invention.

From the foregoing, it will be appreciated that the present invention provides a carrier for mounting a microfiche on one side thereof, to produce a microfiche carrier substantially less costly than existing two-sided carriers in both material and manufacturing costs. Also, the ramps provided on the carrier are effective to preclude edge interference with adjacent carriers and microfiche, in a deck of microfiche carriers, during retrieval of a microfiche carrier from the storage magazine. The rib on the coding tab strengthens the tab, which is acted upon by pusher means or the like during the partial ejection of a microfiche from the deck in the magazine, thereby extending the useful life of the tab.

Further, the arrangement of adhesively securing the microfiche to the carrier provides for quick, easy and accurate securement of the microfiche to the carrier and permits ready replacement of one microfiche with another. The use of a protective cover strip on the adhesive until such time as the microfiche is secured to the carrier eliminates loose adhesive particles on the surface of the carrier, thereby reducing the likelihood of selection difficulties in retrieving a microfiche carrier from the magazine.

What is claimed is:

1. A microfiche carrier, comprising:
   a sheet of flexible transparent material having a first and a second surface defining a carrier;
   a plurality of ramp means on the first surface of the carrier to prevent edge interference with adjacent carriers in response to retrieval of a selected microfiche carrier from a deck of microfiche carriers in a suitable magazine, each said ramp means extending at an incline from a front edge of the ramp means flush with the first surface to a rear edge of the ramp means raised above the first surface; and
   a strip of adhesive means on the first surface adjacent to the rear edges of the ramp means and parallel thereto for securing a microfiche thereto.

2. A microfiche carrier as set forth in claim 1 further comprising a coding tab having a formed surface therein positioned on a front edge of the carrier.

3. A microfiche carrier as set forth in claim 1 further comprising a releasable protective means covering the adhesive means adapted to be removed prior to securing a microfiche thereto.

4. A microfiche carrier as set forth in claim 1 further comprising a detent means including a flexible leg on the carrier for releasably holding the carrier in the magazine.

5. A microfiche carrier as set forth in claim 4 in which the detent means comprises a pair of flexible legs positioned at front corners of the carrier, each said flexible leg having a detent concavity in one edge thereof.

6. A microfiche carrier as set forth in claim 5 in which the flexible legs are formed by a key-hold slot configuration for providing sufficient flexibility to the legs to permit another type of detent means on the magazine to engage the detent concavity.

7. A microfiche carrier as set forth in claim 1 in which the carrier comprises a polyester film.

8. A microfiche carrier, comprising:
   a sheet of flexible transparent material having a first and a second surface defining a carrier;
   a plurality of ramp means on the first surface of the carrier to prevent edge interference with adjacent carriers in response to return of a selected carrier to a deck of carriers in a suitable magazine, each said ramp means extending at an inclined from a front edge of the ramp means flush with the first surface to a rear edge of the ramp raised above the first surface;
   a strip of pressure sensitive adhesive provided on the first surface adjacent to the rear edges of the ramp means and parallel thereto;
   coding means provided with a formed surface therein positioned on a front edge of the carrier; and
   detent means comprising a pair of flexible legs positioned at front corners of the carrier, each said flexible leg having a detent concavity in one edge, said flexible legs being formed by a key-hole slot configuration for providing sufficient flexibility to the legs to permit another type of detent means on the magazine to matingly engage the detent concavity.

* * * * *